Figure 3:
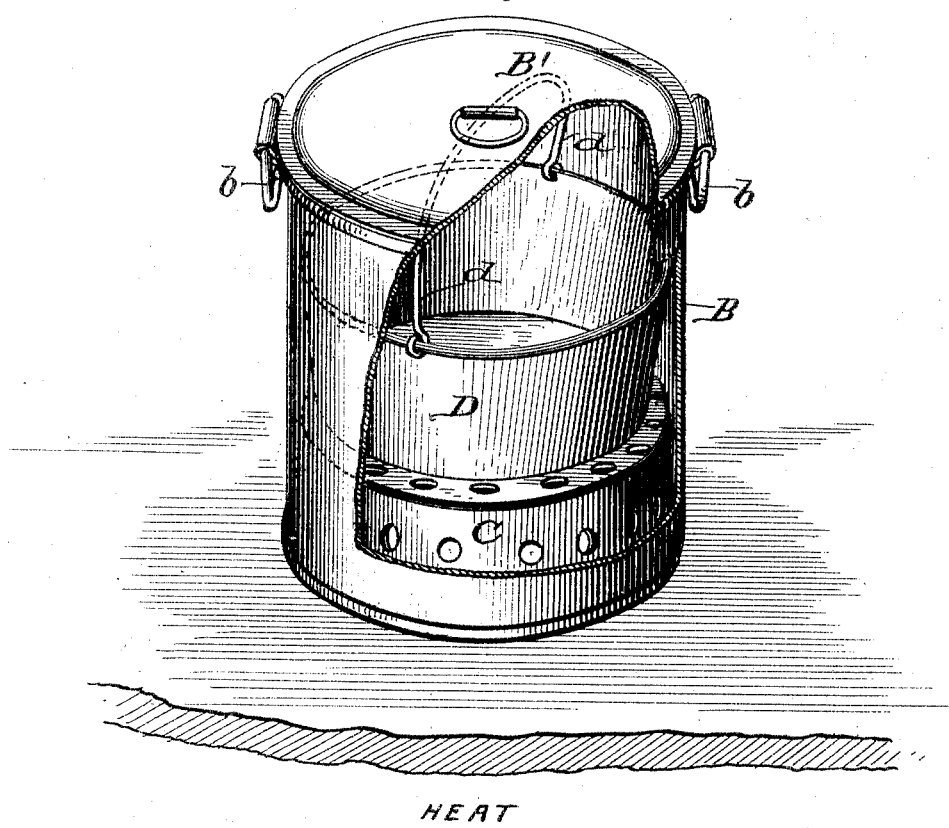

No. 777,103. PATENTED DEC. 13, 1904.
F. KAHN.
APPARATUS FOR COOKING BY RETAINED HEAT.
APPLICATION FILED JULY 1, 1903.
NO MODEL. 2 SHEETS—SHEET 1.
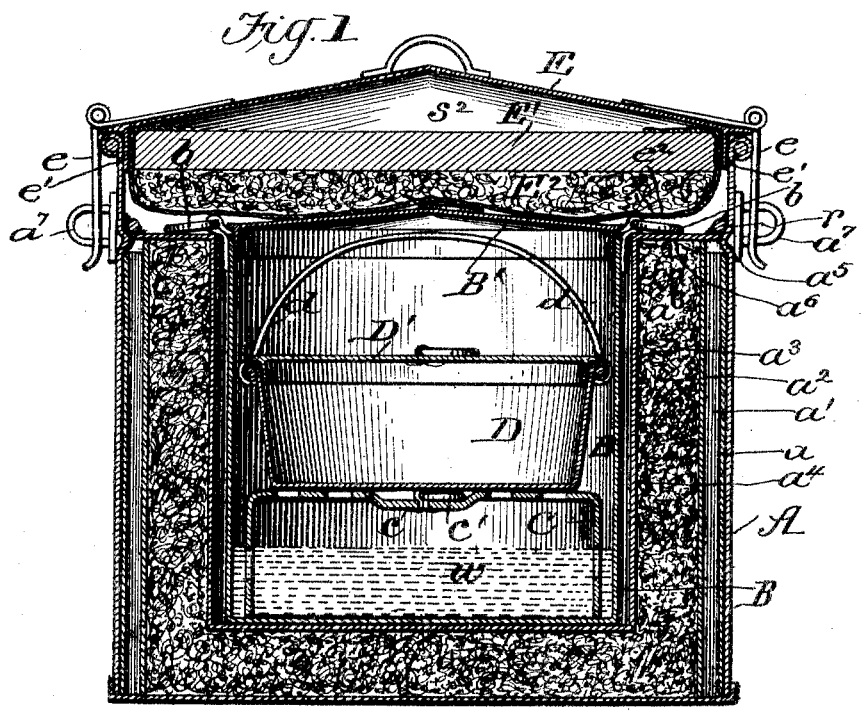
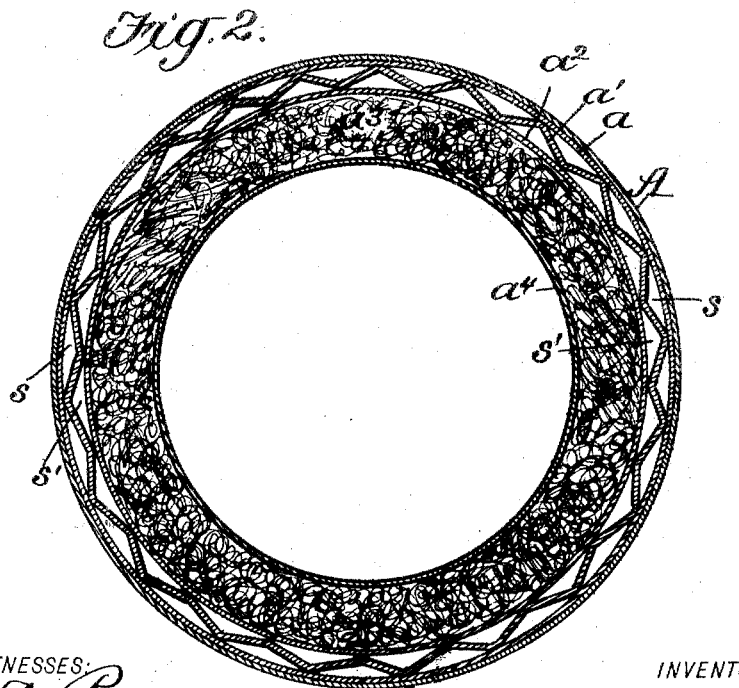
WITNESSES:
Jos. A. Ryan
Edw. W. Byrn.
INVENTOR
Felix Kahn.
BY Munn & Co.
ATTORNEYS.

No. 777,103. PATENTED DEC. 13, 1904.
F. KAHN.
APPARATUS FOR COOKING BY RETAINED HEAT.
APPLICATION FILED JULY 1, 1903.
NO MODEL. 2 SHEETS—SHEET 2.

HEAT

WITNESSES: INVENTOR
Jos. A. Ryan Felix Kahn.
Edw. W. Byrn. BY Munn & Co.
ATTORNEYS.

No. 777,103.　　　　　　　　　　　　　　　　　　　　　　　Patented December 13, 1904.

UNITED STATES PATENT OFFICE.

FELIX KAHN, OF NEW YORK, N. Y., ASSIGNOR TO JAMES S. MacCOY, OF NEW YORK, N. Y.

APPARATUS FOR COOKING BY RETAINED HEAT.

SPECIFICATION forming part of Letters Patent No. 777,103, dated December 13, 1904.

Application filed July 1, 1903. Serial No. 163,875. (No model.)

*To all whom it may concern:*

Be it known that I, FELIX KAHN, a citizen of the United States, and a resident of New York, borough of Manhattan, in the county of New York and State of New York, have invented a new and useful Improvement in Apparatus for Cooking by Retained Heat, of which the following is a specification.

In the cooking of food as ordinarily practiced there is a great waste of heat, care, and attention, an unnecessary amount of wear and tear on the cooking utensils, a large loss of food material, and too frequently an inferior quality of food due to the drying and burning and the loss of the succulent juices which give wholesome, nutritious, and palatable quality to the food. This is so by reason of the fact that the cooking is usually done by a continuous application of heat, which wastes seventy to eighty per cent. of the heat, occupies the stove with utensils for a needless length of time, thereby limiting the capacity of the stove, and subjecting the utensils to just that much more wear and destructive influence of heat, as well as consuming an unnecessarily large amount of fuel.

It is known that after food has been raised to a cooking temperature and is thoroughly permeated by that degree of heat the cooking will proceed if the heat is conserved as against loss by radiation.

I heretofore invented a heat-retaining device for keeping cooked food in a hot state which has been stewed or boiled. By subsequent experiments I found that after having first permeated food with heat at a cooking temperature I was able in that device to stew or boil food to perfection; but I found it physically impossible to steam or dry cook in that device by retained heat. To accomplish these things, I place a body of water in the bottom of the cooking-receptacle and construct a perforated rest, which I place over the water, and on this rest I place a pan or secondary cooking-receptacle containing the food, with a tight-fitting lid for dry cooking and without a lid for steam cooking. By heating the food and water thoroughly in the cooking device thus constructed I am enabled to do both steam and dry cooking by retained heat to perfection. This cannot possibly be done by any other construction within my knowledge.

My invention provides an improved cooking apparatus designed to secure the new results above noted, which I now proceed to describe with reference to the drawings, in which—

Figure 1 is a vertical central section of the entire cooking apparatus. Fig. 2 is a horizontal section of the heat-retainer, and Fig. 3 is a perspective view of the cooking-receptacle and its contained accessories, which are together removable from the heat-retainer and are to be initially applied with the contained food to a stove, electric heater, or any extraneous source of heat and after the food has been thoroughly permeated with a heat of cooking temperature is placed within the heat-retainer, where the cooking is done to completion in a fireless way.

In the drawings, A represents an outer casing whose inner walls are lined and packed as follows: a non-conducting lining $a$ next to the outer casing, a corrugated cylinder $a'$ inside the lining $a$, the corrugations shown running vertically forming two series of air-chambers $s$ and $s'$, another non-conducting lining $a^2$ inside the corrugated cylinder $a'$, a relatively thick packing $a^3$, of non-conducting fiber, and an inner sheet-metal lining $a^4$, which retains the fibrous packing $a^3$. The fibrous packing $a^3$ extends around the sides and also across the bottom of the casing, as seen in Fig. 1.

In the outer sheet-metal casing A there is formed near the upper edges an indented peripheral groove $a^5$, which forms a circular horizontal rib on the inner surface of the sheet metal, and upon this rib and extending over the non-conducting packing and the inner sheet-metal lining $a^4$ of the heat-retainer is an annular metal collar $a^6$, which is soldered in place and closes in the tops of the spaces beside the corrugated shell $a'$ and also the top of the space containing the fibrous material $a^3$. At the angle where this collar joins the side of the casing there is laid above the collar a circular ring $r$, of wire, which is snugly soldered in the angle and serves to reinforce the connection and also to tightly seal the joint against the absorption of the vapors of cooking by the non-conducting packing.

E is a tightly-fitting cover which closes in the top of the casing and has hinged hasps $e$, adapted to engage with protruding staples $a^7$, secured to the sides of the casing, by which the cover may be tightly secured in place. The cover E is made with a depending marginal flange $e'$, which fits with a friction-tight joint within the upper edges of the outer casing. This cover is rendered non-conducting to avoid the loss of heat therethrough by a circular board or other material E', bearing on its lower side a pad formed of a fibrous packing $E^2$, retained by a flexible lining $e^3$, of fabric or other material. This fabric is carried up over the top of the edges of the board E', and the circular board, with the attached pad, is pressed within the depending flange $e'$ of the cover E and is retained frictionally therein, so as to be easily removable. This easy detachability permits the board, with its attached pad, to be easily and quickly removed when there is occasion for it. Between the board E' and the top of the cover E there is an air-space $s^2$.

Within the heat-retainer as thus described is contained the cooking-receptacle B, which is made of a size and shape to approximately fit the inner wall $a^4$ of the heat-retainer and just high enough to allow the handles $b\ b$ of said cooking-receptacle to conveniently lie upon the top of the collar $a^6$, so that said handles may be easily grasped when the cooking-receptacle is to be lifted into or out of the heat-retainer. The cooking-receptacle B is provided with a detachable cover B' and contains three accessory parts. The first of these is an inverted-cup-shaped rest or support C, which is perforated throughout the top and sides and which is nearly but not quite the diameter of the cooking-receptacle and is about three inches high. Another accessory part is a pan D, and the third is a cover D' for the pan. This pan is supported upon the top of the rest C, which latter has a depression $c$ formed in its upper side, into which the ring handle $c'$ of the rest may be folded to allow the pan D to sit flat upon the upper surface of the rest. The pan D has at its upper edge a bail-shaped handle $d$. This bail furnishes means for lifting the pan out of the cooking-receptacle, which could not otherwise be conveniently accomplished, and the handle ring $c'$ of the subjacent rest is for a similar purpose.

To carry out the cooking contemplated by my invention, the receptacle B is lifted by its handles $b\ b$ and placed upon any suitable source of heat, as shown in Fig. 3. This may be a cooking-stove, an electric heater, a gas-stove, or any other extraneous source of heat. The length of time required for the initial application of heat varies somewhat with the bulk and the character of the food being treated and the energy of the fire. Usually from five to thirty minutes will suffice to permeate the contents with a heat of cooking temperature. A carefully-prepared schedule giving for every kind of food the exact time required, as ascertained by elaborate and scientific experiments, will accompany each apparatus. The cooking-receptacle is then, without being opened, transferred to the heat-retainer and is placed therein, as shown in Fig. 1, and the cover E is then placed on, and the cooking will be completely done therein. In this cooking the food is perfectly tender, and the result of the cooking is rendered to a large extent independent of the time of the retention of the food within the apparatus, since the food does not depreciate or become cold, but retains its heat and succulent juices, losing nothing in flavor or weight, but, on the contrary, developing a higher economic and dietetic value and a more wholesome and palatable quality. As the cooking-receptacle may be taken off the stove in so short a time, it will be seen that the stove is then available for other uses, and even a stove of small size, consuming a small amount of fuel, will be found sufficient for the needs of a large family or hotel. Furthermore, the cook or housewife is relieved of all apprehension of the burning of food and of the constant care and attention involved in securing a good result on the ordinary kitchen-stove.

I will now describe the contained accessories of the cooking-receptacle and their correlated values in establishing a unitary organization for my cooking apparatus.

In fully meeting the wants of the cuisine it is necessary that a complete cooking apparatus must be able to do steam cooking and dry cooking, as well as stewing and boiling. The pan D and rest C are designed to thus extend the utility of the cooking apparatus. For steam cooking the food is placed in the pan D with the cover D' off, and the pan D is placed on the perforated rest C, while under the rest and within the cooking-receptacle B is first placed a quantity of water, as shown at $w$. The receptacle B, with the food in the open pan, the pan on the rest, and the water under the rest, is then placed upon the fire or other source of heat, as shown in Fig. 3, and the cover B' tightly closed upon the cooking-receptacle. The water is raised to the temperature of steam cooking with the steam filling the cooking-receptacle and in direct contact with the food. The cooking-receptacle is now transferred, without being opened, to the heat-retainer and is inclosed within the same, where the residual heat in the food and in the body of hot water, and steam rising therefrom, continues the cooking by steam. To do dry cooking, I place the lid D' on the pan, so as to inclose the food and prevent contact of steam with the food. In both cases the body of water acts as a supplementary source of heat to effect the cooking. The moist envelop of steam prevents the food from crusting on top and avoids all necessity for basting in the one case, and the moisture arising from the food and from any liquid in the closed pan therewith likewise effects self-basting in the dry cooking.

The cooking-receptacle and its pan and rest are preferably made of enameled ware.

Having thus described my invention, what I claim as new, and desire to secure by Letters Patent, is—

1. In an apparatus for cooking by retained heat, the combination of a heat-retainer, a removable cooking-receptacle, a removable cooking-pan therein, and means for supporting said pan above the bottom of the cooking-receptacle.

2. In an apparatus for cooking by retained heat, the combination of a heat-retainer, a removable cooking-receptacle, a removable cooking-pan therein, a cover for said pan, and means for supporting said pan above the bottom of the cooking-receptacle.

3. In an apparatus for cooking by retained heat, the combination of a heat-retainer, a removable cooking-receptacle, a removable cooking-pan therein, and a removable rest for said pan.

4. In an apparatus for cooking by retained heat, the combination of a heat-retainer, a removable cooking-receptacle, a cover therefor, a removable cooking-pan in said cooking-receptacle, a cover therefor, and means for supporting said pan above the bottom of the cooking-receptacle.

5. In a cooking apparatus, a heat-retainer consisting of an outer casing with non-conducting inner lining and an indented peripheral groove at the top of said inner lining forming an inwardly-projecting rib, and a covering for the top of the non-conducting lining resting upon and secured to the inwardly-indented rib of the outer casing.

6. In a cooking apparatus, a heat-retainer consisting of an outer casing with non-conducting walls, said outer casing having an indented peripheral groove at the top of said non-conducting walls forming an inwardly-projecting rib, an annular collar covering the top of the non-conducting walls and resting upon the inwardly-indented rib, and a ring arranged above the collar and soldered in the angle between the collar and casing.

7. In a cooking apparatus, the combination with a heat-retainer; of a detachable cover having a pendent flange, a board fitting therein, a pad with a flexible lining extended up over the edges of the board, said edges of the board and flexible lining being frictionally held within and removable from the flange of the cover substantially as described.

8. In an apparatus for cooking by retained heat, the combination of a heat-retainer having non-conducting walls and cover, a detachable cooking-receptacle having conducting-walls and cover fitting closely within the heat-retainer, a removable cooking-pan located within the cooking-receptacle, a cover therefor, and means for supporting the pan above the bottom of the cooking-receptacle.

FELIX KAHN.

Witnesses:
 JAMES S. MACCOY,
 E. M. HOLMES.